United States Patent
Takano

(10) Patent No.: US 10,880,893 B2
(45) Date of Patent: *Dec. 29, 2020

(54) TRANSMISSION OF DISCOVERY SIGNAL IN SMALL CELLS WHILE IN OFF STATE

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,353

(22) Filed: Oct. 25, 2019

(65) Prior Publication Data

US 2020/0059933 A1 Feb. 20, 2020

Related U.S. Application Data

(63) Continuation of application No. 15/741,576, filed as application No. PCT/JP2016/067158 on Jun. 9, 2016, now Pat. No. 10,512,086.

(30) Foreign Application Priority Data

Sep. 4, 2015 (JP) ................................. 2015-174902

(51) Int. Cl.
*H04W 72/04* (2009.01)
*H04W 16/32* (2009.01)
(Continued)

(52) U.S. Cl.
CPC ....... *H04W 72/0453* (2013.01); *H04W 16/14* (2013.01); *H04W 16/32* (2013.01);
(Continued)

(58) Field of Classification Search
CPC .. H04W 72/0453; H04W 16/14; H04W 24/10
See application file for complete search history.

(56) References Cited

U.S. PATENT DOCUMENTS 9,712,262 B2 * 7/2017 Yi ....................... H04B 17/318
2013/0170406 A1 7/2013 Kishiyama
(Continued)

FOREIGN PATENT DOCUMENTS

| EP | 3030001 A | 6/2016 |
|----|-----------|--------|
| JP | 2015-061262 A | 3/2015 |
| WO | 2015115986 A1 | 8/2015 |

OTHER PUBLICATIONS

Huawei, "RAN3 Consideration for Small cell on/off and discovery", 3GPP TSG-RAN3 Meeting #84, R3-141048, May 19-23, 2014, Total 3 pages.

(Continued)

*Primary Examiner* — Deepa Belur
(74) *Attorney, Agent, or Firm* — Xsensus LLP

(57) ABSTRACT

[Object] To provide a mechanism that enables a signal for measurement to be transmitted in a partial frequency band and measured on the terminal apparatus side.
[Solution] An apparatus that operates a small cell, the apparatus including: a processing unit configured to select, from among one or more unit frequency bands in an off state in a plurality of unit frequency bands that may be brought into an on state for uplink communication or downlink communication in the small cell, the unit frequency band in an off state to be used for transmission of a discovery signal to enable measurement in the unit frequency band in an off state.

22 Claims, 14 Drawing Sheets

(51) Int. Cl.
*H04W 24/10* (2009.01)
*H04W 16/14* (2009.01)
*H04W 48/16* (2009.01)
*H04W 52/02* (2009.01)

(52) U.S. Cl.
CPC ........... *H04W 24/10* (2013.01); *H04W 48/16* (2013.01); *H04W 52/0206* (2013.01); *H04W 52/0241* (2013.01); *Y02D 30/70* (2020.08)

(56) References Cited

U.S. PATENT DOCUMENTS

| | | | |
|---|---|---|---|
| 2015/0223245 A1 | 8/2015 | Cheng et al. | |
| 2015/0271744 A1* | 9/2015 | Liu | H04L 5/005 370/329 |
| 2015/0358899 A1* | 12/2015 | Ko | H04W 24/08 370/252 |
| 2016/0043843 A1 | 2/2016 | Liu et al. | |
| 2016/0183263 A1 | 6/2016 | Liu et al. | |
| 2016/0219453 A1 | 7/2016 | Harada et al. | |
| 2016/0302152 A1 | 10/2016 | Morita et al. | |
| 2016/0373915 A1 | 12/2016 | Kim et al. | |
| 2017/0094585 A1* | 3/2017 | Byun | H04W 48/12 |
| 2017/0099693 A1* | 4/2017 | Deng | H04W 76/15 |
| 2018/0020339 A1 | 1/2018 | Agiwal et al. | |

OTHER PUBLICATIONS

Samsung, "LAA SCell Activation and Deactivation", 3GPP TSG-RAN WG2#91, R2-153779, Aug. 24-26, 2015, Total 3 pages.

ETRI, "Discussion on Carrier Selection in LAA", 3GPP TSG RAN WG2 #89bis, R2-151292, Apr. 20-24, 2015, Total 4 pages.

Samsung, "Discussion on carrier selection for LAA", 3GPP TSG RAN WG1 #81, R1-152869, May 25-29, 2015, Total 3 pages.

International Search Report dated Aug. 30, 2016 in PCT/JP2016/067158 filed on Jun. 9, 2016.

3GPP, "Views on Benefit of Small Cell Discovery Based on Discovery Signal" Agenda Item: 7.2.6.1.2, NTT DOCOMO, 3GPP TSG RAN WGI Meeting #74, R1-133458, Barcelona, Spain, Aug. 19-23, 2013, 4 pages.

3GPP "Further Considerations on enhanced transition procedures of small cell on/off scheme" Agenda Item: 6.2.6.2, ZTE, 3GPP TSG RAN WG1 Meeting #75, R1-135350, San Francisco, USA, Nov. 11-15, 2013, 8 pages.

* cited by examiner

FIG. 9

| | |
|---|---|
| 1st bit (CC1) | 0/1 |
| 2nd bit (CC2) | 0/1 |
| 3rd bit (CC3) | 0/1 |
| 4th bit (CC4) | 0/1 |
| 5th bit (CC5) | 0/1 |
| 6th bit (CC6) | 0/1 |
| 7th bit (CC7) | 0/1 |

FIG. 10

| | |
|---|---|
| 1st bit (CC1) | 0/1 |
| 2nd bit (CC2) | 0/1 |
| 3rd bit (CC3) | 0/1 |
| 4th bit (CC4) | 0/1 |

TRANSMISSION OF DISCOVERY SIGNAL IN SMALL CELLS WHILE IN OFF STATE

CROSS-REFERENCE TO RELATED APPLICATIONS

The present application is a continuation of U.S. application Ser. No. 15/741,576, filed Jan. 3, 2018, which is based on PCT filing PCT/JP2016/067158, filed Jun. 9, 2016, which claims priority to JP 2015-174902, filed Sep. 4, 2015, the entire contents of each are incorporated herein by reference.

TECHNICAL FIELD

The present disclosure relates to an apparatus and a method.

BACKGROUND ART

Wireless communication environment in recent years faces a problem of a rapid increase in data traffic. Hence, in 3GPP, installing a large number of small cells in a macro cell to increase network density, thereby distributing traffic, has been under study. Such a technology utilizing small cells is referred to as small cell enhancement. Note that small cells may conceptually include various types of cells (e.g., a femto cell, a nano cell, a pico cell, a micro cell, and the like) that are smaller than a macro cell and are arranged to overlap a macro cell. However, an increase in small cells may cause an increase in inter-cell interference and lead to large power consumption of the entire network; hence, in Patent Literature 1 below, a technology of adaptively setting a small cell in a sleep state has been developed.

In addition, as one way to expand radio resources, utilization of a frequency band of 6 GHz or more, which is called a milli-wave zone, has been under study. However, since the milli-wave zone has strong straightness and exhibits large radio propagation attenuation, utilization in a small cell smaller than a macro cell is expected. Under a situation in which the broad frequency band of the milli-wave zone is not entirely used, part of the frequency band can be turned on/off in the small cell. Further, in regard to a frequency band in an off state, a signal for measurement to enable measurement of quality on the terminal apparatus side is transmitted from a base station.

CITATION LIST

Patent Literature

Patent Literature 1: JP 2015-61262A

DISCLOSURE OF INVENTION

Technical Problem

However, transmitting a signal for measurement using the whole of the broad frequency band of the milli-wave zone imposes a large burden on the base station side in terms of electric power. In addition, measuring a signal for measurement in the whole of the broad frequency band imposes a large burden also on the terminal apparatus side in terms of electric power. Therefore, it is desirable to provide a mechanism that enables a signal for measurement to be transmitted in a partial frequency band and measured on the terminal apparatus side.

Solution to Problem

According to the present disclosure, there is provided an apparatus that operates a small cell, the apparatus including: a processing unit configured to select, from among one or more unit frequency bands in an off state in a plurality of unit frequency bands that may be brought into an on state for uplink communication or downlink communication in the small cell, the unit frequency band in an off state to be used for transmission of a discovery signal to enable measurement in the unit frequency band in an off state.

In addition, according to the present disclosure, there is provided an apparatus that connects to a small cell, the apparatus including: a processing unit configured to perform measurement regarding a discovery signal that has been transmitted using a unit frequency band selected from one or more unit frequency bands in an off state in a plurality of unit frequency bands that may be brought into an on state for uplink communication or downlink communication in the small cell.

In addition, according to the present disclosure, there is provided a method including: selecting, by a processor, from among one or more unit frequency bands in an off state in a plurality of unit frequency bands that may be brought into an on state for uplink communication or downlink communication in a small cell, the unit frequency band in an off state to be used for transmission of a discovery signal to enable measurement in the unit frequency band in an off state.

In addition, according to the present disclosure, there is provided a method including: performing, by a processor, measurement regarding a discovery signal that has been transmitted using a unit frequency band selected from one or more unit frequency bands in an off state in a plurality of unit frequency bands that may be brought into an on state for uplink communication or downlink communication in a small cell.

Advantageous Effects of Invention

As described above, according to the present disclosure, a mechanism that enables a signal for measurement to be transmitted in a partial frequency band and measured on the terminal apparatus side is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is an explanatory diagram for describing a technical feature according to the embodiment.

FIG. 10 is an explanatory diagram for describing a technical feature according to the embodiment.

MODE(S) FOR CARRYING OUT THE INVENTION

Figure 1:
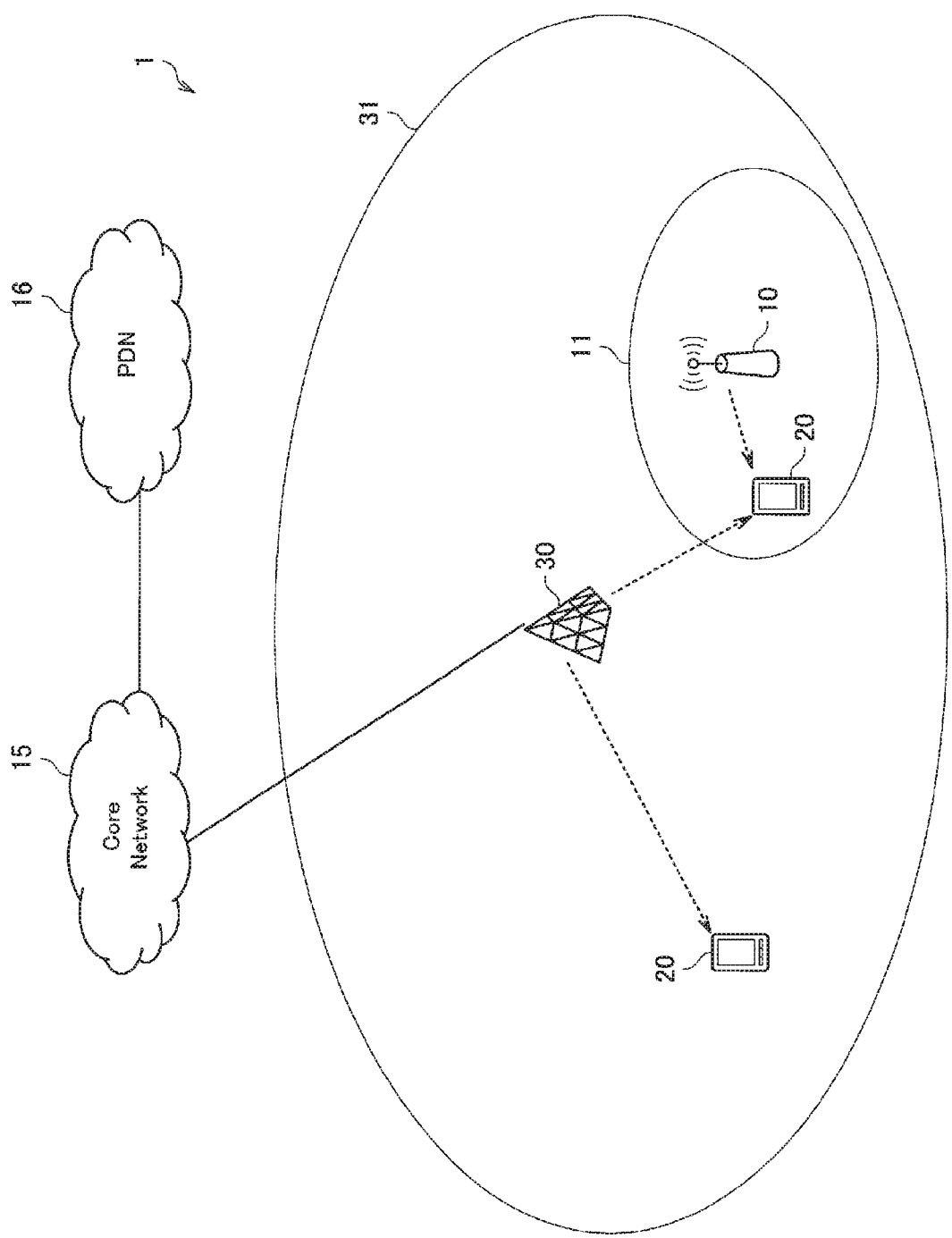
FIG. 1 is an explanatory diagram for describing an overview of a system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Introduction
　1.1. Small cell
　1.2. Carrier aggregation
　1.3. On/off of component carrier
2. Configuration examples
　2.1. Configuration example of small cell base station
　2.2. Configuration of terminal apparatus
3. First embodiment
　3.1. Technical problems
　3.2. Technical features
　3.3. Flow of process
4. Second embodiment
　4.1. Technical problem
　4.2. Technical features
　4.3. Flow of process
5. Application examples
6. Conclusion 1. Introduction <1.1. Small cell>

FIG. 1 is an explanatory diagram for describing an overview of a system 1 according to an embodiment of the present disclosure. As illustrated in FIG. 1, the system 1 includes a wireless communication apparatus 10, a terminal apparatus 20, and a communication control apparatus 30.

In the example of FIG. 1, the communication control apparatus 30 is a macro cell base station. The macro cell base station 30 provides a wireless communication service for one or more terminal apparatuses 20 located inside a macro cell 31. The macro cell base station 30 is connected to a core network 15. The core network 15 is connected to a packet data network (PDN) 16 via a gateway apparatus (not illustrated). The macro cell 31 may be operated in accordance with any wireless communication scheme, such as long term evolution (LTE), LTE-advanced (LTE-A), GSM (registered trademark), UMTS, W-CDMA, CDMA200, WiMAX, WiMAX2, or IEEE802.16, for example. Note that without being limited to the example of FIG. 1, a control node in the core network 15 or the PDN 16 (a host node of the macro cell base station) may have a function of controlling wireless communication in a macro cell and a small cell in a cooperative manner. Note that the macro cell base station may also be referred to as a Macro eNodeB.

The wireless communication apparatus 10 is a small cell base station that operates a small cell 11. Typically, the small cell base station 10 is authorized to allocate radio resources to the terminal apparatus 20 that connects to the own apparatus. However, allocation of radio resources may be at least partially entrusted to the communication control apparatus 30 for cooperative control. A wireless communication apparatus 20 may be a small cell base station fixedly installed as illustrated in FIG. 1, or may be a dynamic access point (AP) that dynamically operates the small cell 11. Note that the small cell base station may also be referred to as a pico eNB or a Femto eNB.

The terminal apparatus 20 connects to the macro cell base station 30 or the small cell base station 10 to enjoy a wireless communication service. For example, the terminal apparatus 20 that connects to the small cell base station 10 receives a control signal from the macro cell base station 30, and receives a data signal from the small cell base station 10. The terminal apparatus 20 is also called a user. The user may also be called user equipment (UE). Here, UE may be UE defined in LTE or LTE-A, or more generally may mean communication equipment.

<1.2. Carrier aggregation>

A technology related to carrier aggregation prescribed in LTE Release 10 is described below.

(1) Component carrier

Carrier aggregation is a technology of improving throughput of communication by forming a communication channel between a base station and a terminal apparatus by aggregating a plurality of unit frequency bands supported in LTE, for example. Individual unit frequency bands included in one communication channel formed by carrier aggregation are referred to as component carriers (CCs). Here, a CC may be a CC defined in LTE or LTE-A, or more generally may mean a unit frequency band.

In LTE Release 10, it is possible to aggregate five CCs at maximum. In addition, one CC has a width of 20 MHz. Note that the CCs to be aggregated may be arranged consecutively on a frequency axis, or may be arranged apart from each other. Moreover, which CC to aggregate and use can be set for each terminal apparatus.

The plurality of CCs that are aggregated are classified into one primary component carrier (PCC) and a secondary component carrier (SCC) other than the PCC. The PCC is different for each terminal apparatus. Since the PCC is the most important CC, it is desirable that the CC with the most stable communication quality be selected.

Figure 2:
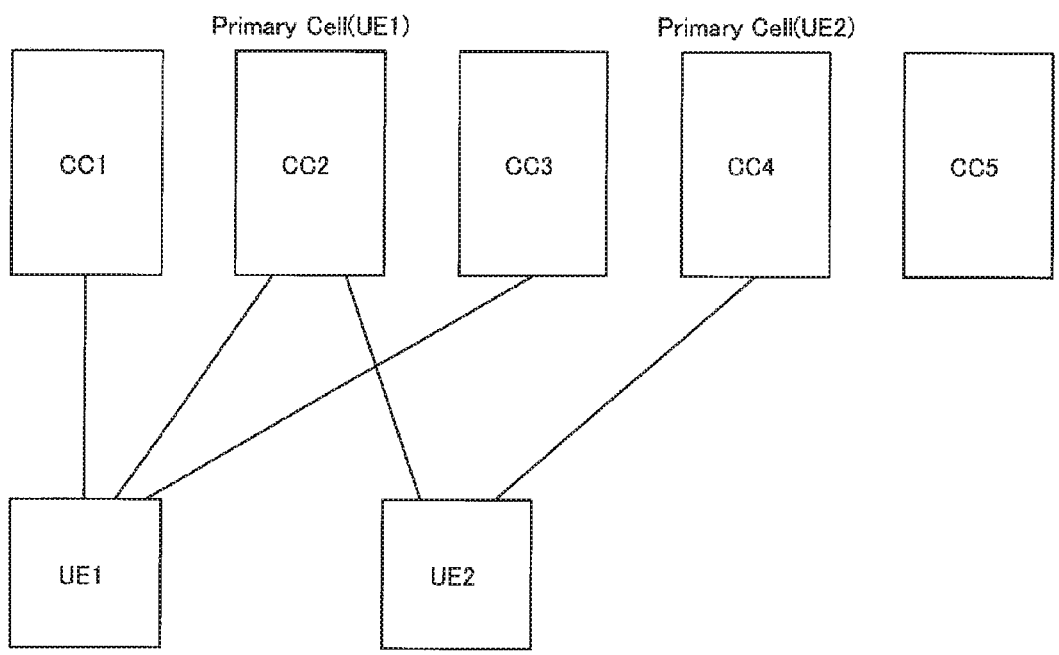
FIG. 2 is an explanatory diagram for describing component carriers.

FIG. 2 is an explanatory diagram for describing component carriers. In the example illustrated in FIG. 2, a situation in which two pieces of UE use some of five CCs in aggregation is illustrated. In detail, UE1 uses CC1, CC2, and CC3 in aggregation, and UE2 uses CC2 and CC4 in aggregation. Moreover, the PCC of UE1 is CC2. The PCC of UE2 is CC4.

Here, selection of a PCC is dependent on implementation. An SCC is changed by deleting the SCC and adding another SCC. That is, it is difficult to directly change an SCC.

(2) Formation and Change of PCC

In the case where a terminal apparatus transitions from an RRC Idle state to an RRC Connected state, the CC in which connection is established first is the PCC. A change of the PCC is performed through a procedure similar to handover.

A PCC is formed through a procedure called Connection establishment. This procedure is a procedure started with a request from the terminal apparatus side used as a trigger.

A PCC is changed through a procedure called Connection Reconfiguration. This procedure includes transmission and reception of handover messages. This procedure is a procedure started from the base station side.

(3) Addition of SCC

An SCC is added through a procedure called Connection Reconfiguration. This procedure is a procedure started from the base station side. An SCC is added to a PCC and belongs to the PCC. Adding an SCC is also referred to as activating an SCC.

(4) Deletion of SCC

An SCC is deleted through a procedure called Connection Reconfiguration. This procedure is a procedure started from the base station side. In this procedure, a specific SCC designated in a message is deleted. Note that deletion of an SCC is performed also through a procedure called Connection Re-establishment. This procedure is a procedure started from the terminal apparatus side. Through this procedure, all the SCCs are deleted. Deleting an SCC is also referred to as deactivating an SCC.

(5) Special Role of PCC

A PCC has a special role different from that of an SCC. For example, transmission and reception of NAS signaling in Connection establishment is performed only in the PCC. In addition, transmission of a physical uplink control channel (PUCCH) is performed only in the PCC. Note that examples of an uplink control signal include ACK or NACK indicating success for failure of reception for data transmitted in downlink, a scheduling request, and the like. Moreover, a procedure from detection of Radio Link Failure to Connection Re-establishment is also performed only in the PCC.

<1.3. On/off of component carrier>

In regard to carrier aggregation, a technology prescribed in LTE Release 12 is described below.

In LTE Release 12, a scenario is shown in which a macro cell base station and a small cell base station use different frequencies. For example, a frequency of approximately 2 GHz may be allocated to the macro cell base station, and a high frequency such as 5 GHz may be allocated to the small cell base station.

Moreover, LTE Release 12 prescribes that at least part of a frequency band is intermittently turned on/off (i.e., brought into an on state/an off state) by a base station. The first purpose of this is to reduce power consumption by small cell base stations, which are large in number. In addition, the second purpose is to reduce interference by turning off a frequency band that does not need to be used.

Figure 3:
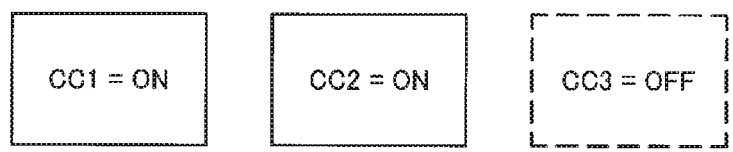
FIG. 3 is an explanatory diagram for describing on/off of component carriers.

FIG. 3 is an explanatory diagram for describing on/off of component carriers. FIG. 3 illustrates examples of CCs provided by a base station; CC1 and CC2 are in an on state, and CC3 is in an off state. A terminal apparatus can activate a CC in an on state, thereby performing uplink communication or downlink communication using the CC with the base station. That is, CCs in an on state are candidates for CCs that can be activated. In regard to CC3 in an off state, the base station transmits a signal for measurement to enable measurement of quality on the terminal apparatus side. This signal for measurement may also be called a discovery reference signal (DRS). Here, a DRS may be a DRS defined in LTE or LTE-A, or more generally may mean a signal for measurement (e.g., a discovery signal). The terminal apparatus measures quality of a downlink channel of CC3 in an off state with the DRS, and reports a measurement result to a cell base station. The base station determines whether or not to turn on CC3 in an off state on the basis of this measurement result.

Figure 4:
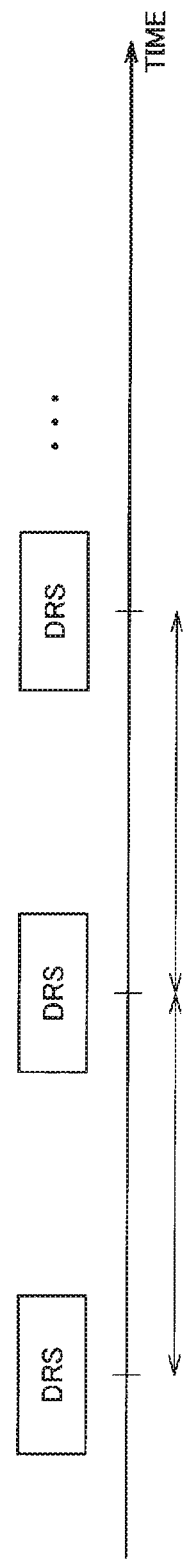
FIG. 4 is an explanatory diagram for describing a DRS.

FIG. 4 is an explanatory diagram for describing a DRS. FIG. 4 schematically illustrates transmission timing of the DRS. As illustrated in FIG. 4, the DRS may be transmitted intermittently and periodically. A cycle may be 50 milliseconds (ms), for example. In addition, this cycle is variable, and cycle setting information is reported from the base station to the terminal apparatus. In contrast, a cell specific reference signal (CRS), which is a reference signal, is inserted into all sub-frames, and its cycle is 1 ms, for example.

Figure 5:
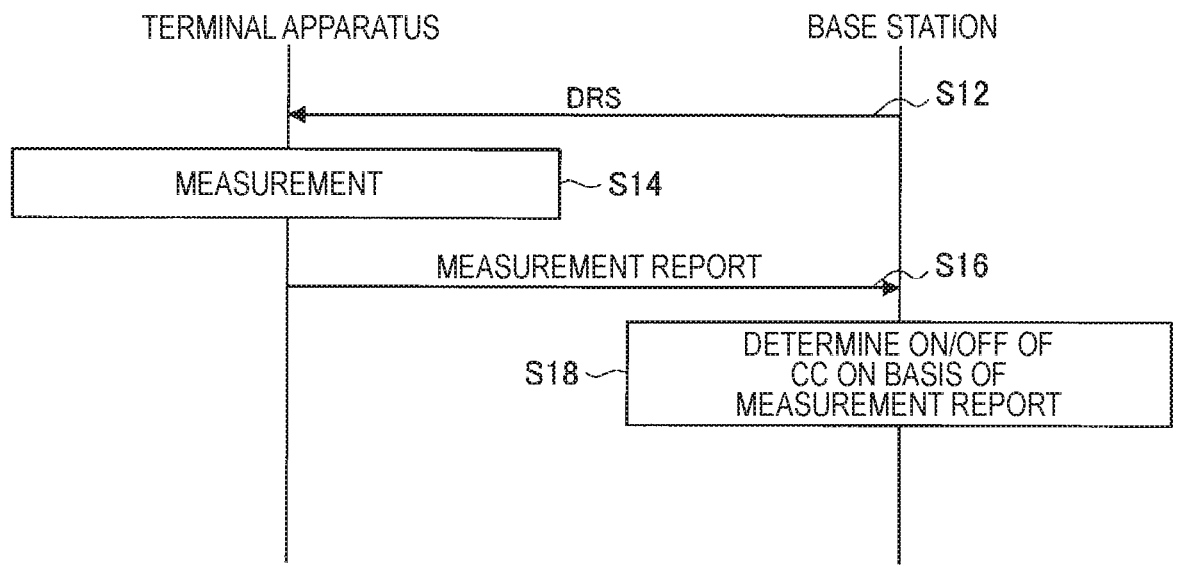
FIG. 5 is a sequence diagram illustrating an example of the flow of a process related to measurement of a DRS.

FIG. 5 is a sequence diagram illustrating an example of the flow of a process related to measurement of a DRS. As illustrated in FIG. 5, first, the base station transmits a DRS (step S12). On that occasion, the base station is assumed to transmit the DRS periodically with a transmission cycle and a CC set in common with the terminal apparatus preliminarily, in the CC in an off state. The terminal apparatus performs measurement of the DRS in accordance with preliminary setting (step S14), and transmits the measurement result to the base station (step S16). In this specification, measurement of the DRS is also referred to as measurement, and the measurement result is also referred to as a measurement report. Note that the measurement report is transmitted using uplink of a CC in an on state. The base station determines on/off of a CC on the basis of the measurement report (step S18). For example, the base station turns on a CC in an off state that is to be turned on, and turns off a CC in an on state that is to be turned off.

In typical implementation, not a macro cell base station but a small cell base station turns on/off component carriers. Therefore, the following description is given in regard to a small cell base station that turns on/off component carriers. As a matter of course, this does not narrow the scope of application of the present technology, and the present technology is also applicable to a macro cell base station and the like.

2. Configuration Examples

<2.1. Configuration example of small cell base station>

Figure 6:
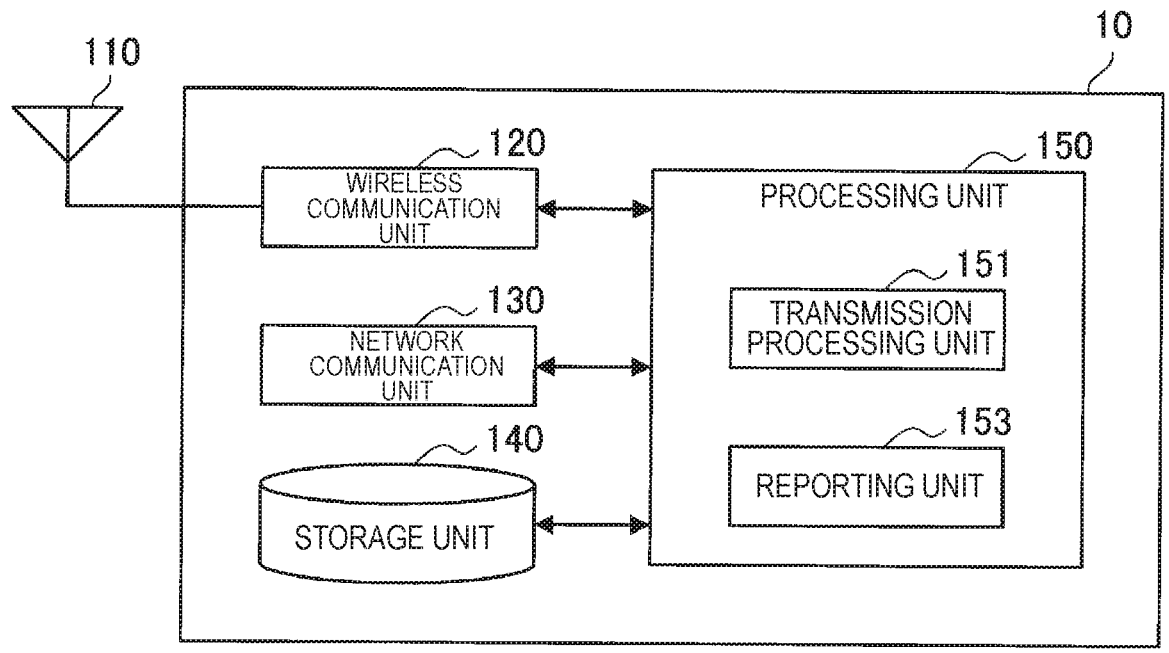
FIG. 6 is a block diagram illustrating an example of the configuration of a small cell base station according to the embodiment.

Next, the configuration of the small cell base station 10 according to an embodiment of the present disclosure will be described with reference to FIG. 6. FIG. 6 is a block diagram illustrating an example of the configuration of the small cell base station 10 according to an embodiment of the present disclosure. Referring to FIG. 6, the small cell base station 10 includes an antenna unit 110, a wireless communication unit 120, a network communication unit 130, a storage unit 140, and a processing unit 150.

(1) Antenna Unit 110

The antenna unit 110 radiates a signal output by the wireless communication unit 120, in the form of radio waves, into space. The antenna unit 110 also converts radio waves in space into a signal, and outputs the signal to the wireless communication unit 120.

(2) Wireless Communication Unit 120

The wireless communication unit 120 transmits and receives signals. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to other nodes and receives information from other nodes. For example, the other nodes include other base stations and a core network node.

(4) Storage Unit 140

The storage unit 140 temporarily or permanently stores a program and various data for operation of the small cell base station 10.

(5) Processing Unit 150

The processing unit 150 provides various functions of the small cell base station 10. The processing unit 150 includes a transmission processing unit 151 and a reporting unit 153. Note that the processing unit 150 may further include a structural element other than these structural elements. That is, the processing unit 150 may perform operation other than the operation of these structural elements.

The operation of the transmission processing unit 151 and the reporting unit 153 will be described in detail later.

<2.2. Configuration of terminal apparatus>

Figure 7:
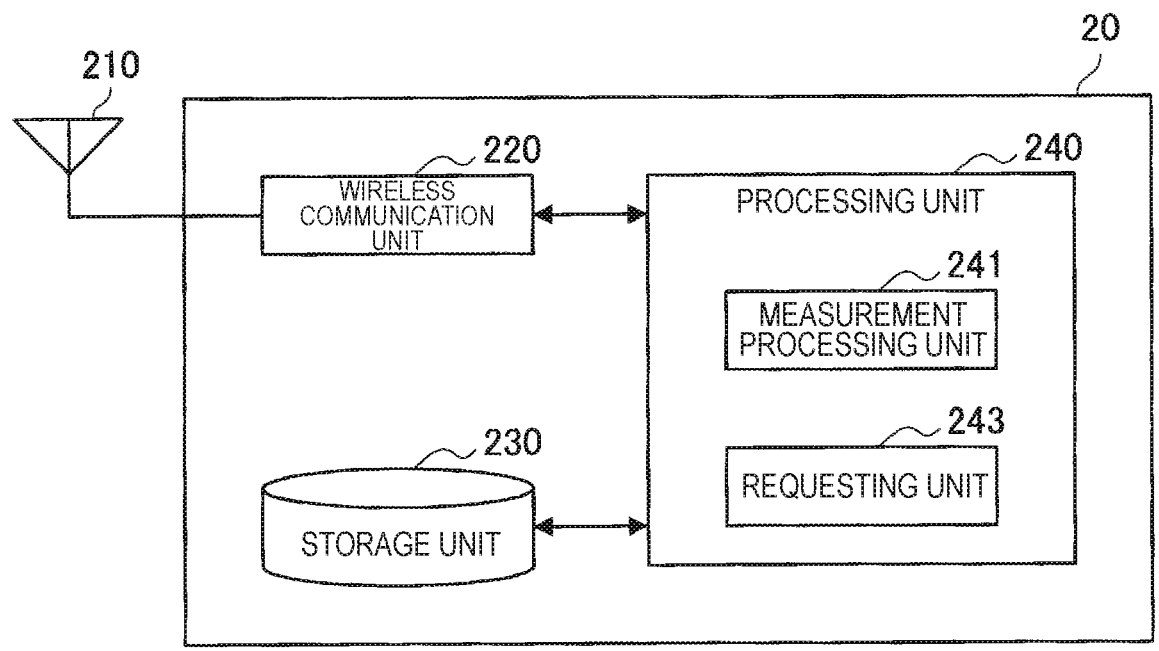
FIG. 7 is a block diagram illustrating an example of the configuration of a terminal apparatus according to the embodiment.

Next, an example of the configuration of the terminal apparatus 20 according to an embodiment of the present disclosure will be described with reference to FIG. 7. FIG. 7 is a block diagram illustrating an example of the configuration of the terminal apparatus 20 according to an embodiment of the present disclosure. Referring to FIG. 7, the terminal apparatus 20 includes an antenna unit 210, a wireless communication unit 220, a storage unit 230 and a processing unit 240.

(1) Antenna Unit 210

The antenna unit 210 radiates a signal output by the wireless communication unit 220, in the form of radio waves, into space. The antenna unit 210 also converts radio waves in space into a signal, and outputs the signal to the wireless communication unit 220.

(2) Wireless communication unit 220

The wireless communication unit 220 transmits and receives signals. For example, the wireless communication unit 220 receives a downlink signal from the base station and transmits an uplink signal to the base station.

(3) Storage unit 230

The storage unit 230 temporarily or permanently stores a program and various data for operation of the terminal apparatus 20.

(4) Processing unit 240

The processing unit 240 provides various functions of the terminal apparatus 20. The processing unit 240 includes a measurement processing unit 241 and a requesting unit 243. Note that the processing unit 240 may further include a structural element other than these structural elements. That is, the processing unit 240 may perform operation other than the operation of these structural elements.

The operation of the measurement processing unit 241 and the requesting unit 243 will be described in detail later.

3. First Embodiment

<3.1. Technical problems>

(1) First Problem

A milli-wave zone has a broad frequency band. Transmitting a DRS using all the CCs included in the broad frequency band of the milli-wave zone imposes a large burden on the small cell base station 10 in terms of electric power. Furthermore, transmitting and receiving a DRS using all the CCs included in the broad frequency band of the milli-wave zone may also cause an increase in inter-cell interference as well as an increase in power consumption.

Hence, the present embodiment provides a mechanism in which the small cell base station 10 can transmit a DRS in some of a plurality of CCs in an off state.

Here, it is assumed that in the milli-wave zone, a bandwidth of a CC, which is set at 20 MHz in LTE Release 10, can be changed to wider bandwidths such as 40 MHZ, 80 MHz, or 160 MHz, for example. In the case where such enlargement of bandwidth is carried out, a mechanism in which a DRS can be transmitted in some of CCs and measured can be said to be effective for a reduction in burden in terms of electric power.

(2) Second Problem

It is assumed that there are a plurality of types of bandwidths of CCs. As examples, a CC with a bandwidth of 20 MHz, a CC with a bandwidth of 40 MHz, and a CC with a bandwidth of 80 MHz are assumed. In addition, it is assumed to be possible to select, for each terminal apparatus, whether to use a bandwidth of 80 MHz as one CC with a bandwidth of 80 MHz, as two CCs with a bandwidth of 40 MHz, or as four CCs with a bandwidth of 20 MHz. For example, in the case where a terminal apparatus has only ability to handle a bandwidth of 20 MHz, it is desirable that a CC with a bandwidth of 20 MHz be brought into an on state. Therefore, the terminal apparatus only needs to perform measurement regarding a CC with a bandwidth of 20 MHz, and measurement regarding a CC with a bandwidth of 80 MHz, for example, is unnecessary. Since a CC with a bandwidth for which such measurement is to be performed may differ for each terminal apparatus, it is inefficient to transmit a DRS in CCs with the same bandwidth in common for all terminal apparatuses.

Hence, the present embodiment provides a mechanism in which a terminal apparatus can request a CC in which a base station transmits a DRS.

(3) Third Problem

Measuring a DRS in all the CCs included in the broad frequency band imposes a large burden in terms of electric power on not only the base station but also the terminal apparatus side. Particularly in the case where a base station transmits a DRS in some of CCs as described in the first embodiment, measuring the DRS in all the CCs on the terminal apparatus side causes waste in terms of power consumption.

In regard to this point, under present circumstances, with which cycle a DRS is transmitted for each CC is reported to the terminal apparatus side preliminarily by RRC signaling. However, under a situation in which whether or not a DRS is transmitted may be switched frequently for each CC, reporting to the terminal apparatus cannot be said to be sufficient.

Hence, the present embodiment provides a mechanism in which information regarding a DRS can be dynamically reported to a terminal apparatus.

<3.2. Technical features>
(1) Provision of DRS

The small cell base station 10 (e.g., the transmission processing unit 151) selects a CC in an off state to be used for transmission of a DRS to enable measurement in one or more CCs in an off state, from among a plurality of CCs that may be brought into an on state for uplink transmission or downlink transmission in a small cell. Thus, the small cell base station 10 can transmit the DRS selectively in a partial band of the broad milli-wave zone, which enables a reduction in power consumption and also a reduction in inter-cell interference. The small cell base station 10 transmits the DRS using the selected CC.

For example, the small cell base station 10 (e.g., the transmission processing unit 151) may increase CCs used for transmission of the DRS in a stepwise manner. Conversely, the small cell base station 10 may reduce CCs used for transmission of the DRS in a stepwise manner. This makes it possible to provide the DRS in just enough number of CCs, in accordance with an increase tendency or a decrease tendency of the number of users in a cell, for example. As another example, the small cell base station 10 may use all the CCs that can be brought into an on state for transmission of the DRS in a stroke.

Figure 8:
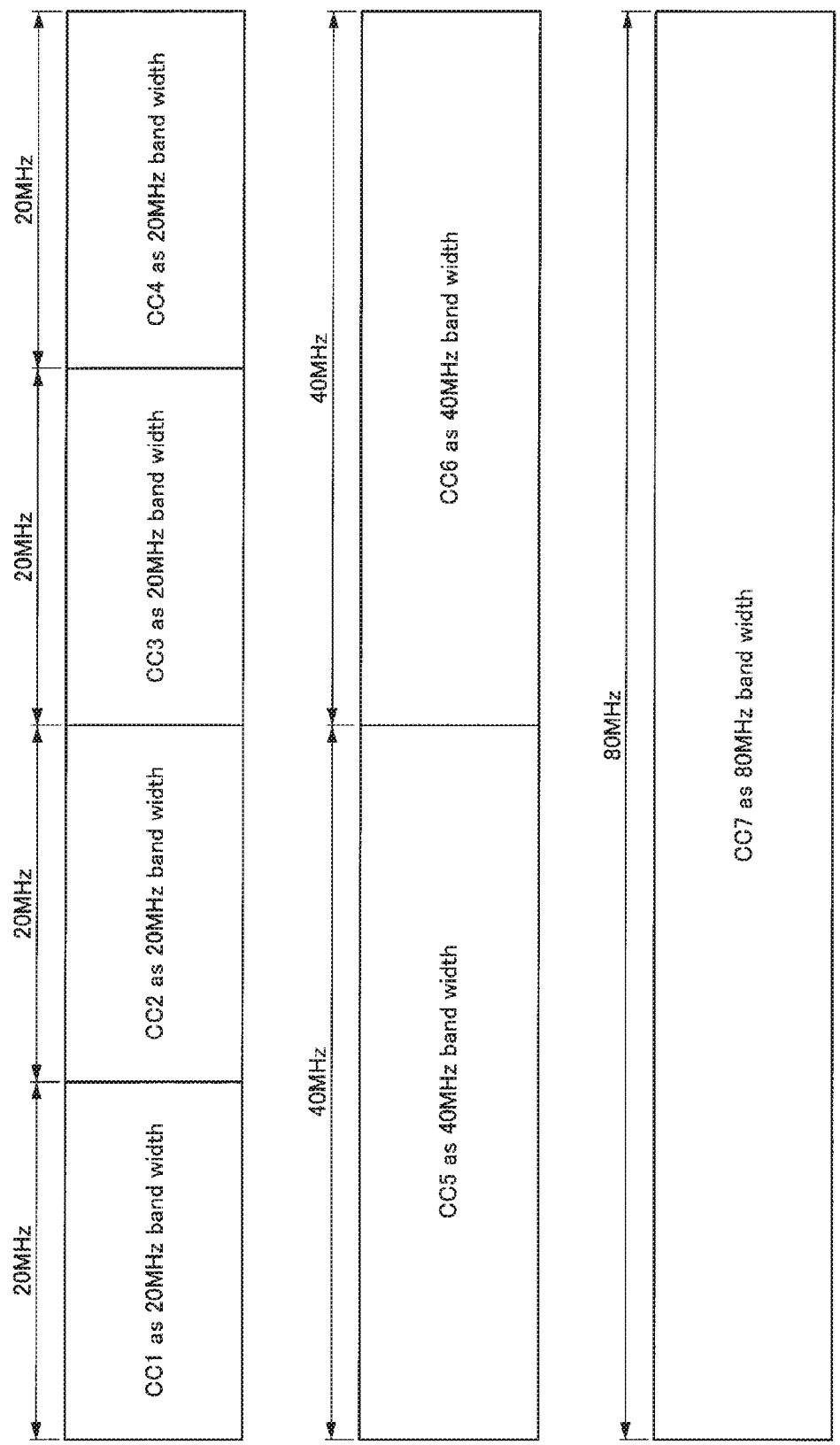
FIG. 8 is an explanatory diagram for describing a technical feature according to a first embodiment.

Here, selection of a CC for providing the DRS is specifically described with reference to FIG. 8 illustrating an example of a configuration of CCs. The CCs illustrated in FIG. 8 are CCs that can be brought into an on state, and are CCs that may be used for transmission of the DRS. CC1 to CC4 are CCs with a bandwidth of 20 MHz. CC5 and CC6 are CCs with a bandwidth of 40 MHz. CC7 is a CC with a bandwidth of 80 MHz. For example, in the case where all the CCs are in an off state, the small cell base station 10 provides the DRS in CC1. Then, in the case where CC1 is turned on, the small cell base station 10 provides the DRS in CC2. Then, in the case where CC2 is turned on, the small cell base station 10 provides the DRS in CC3. Then, in the case where CC3 is turned on, the small cell base station 10 provides the DRS in CC4. As a matter of course, the small cell base station 10 may provide the DRS in CC5 to CC7, or may provide the DRS in a plurality of CCs. In addition, in the case where there is a change in a CC for providing the DRS, the small cell base station 10 reports the change to the terminal apparatus 20. This point will be described in detail later.

In addition, the small cell base station 10 (e.g., the transmission processing unit 151) may select a CC to be used for transmission of the DRS, on the basis of a measurement result of the DRS in the terminal apparatus 20 that connects to the small cell. This makes it possible to provide the DRS in a CC corresponding to fluctuation of radio-wave environment, for example.

The terminal apparatus 20 (e.g., the measurement processing unit 241) performs measurement regarding the DRS that has been transmitted using a CC selected from one or more CCs in an off state, among a plurality of CCs that may be brought into an on state for uplink transmission or downlink transmission in the small cell. Thus, the terminal apparatus 20 can perform measurement in a partial band of the broad milli-wave zone, which enables a reduction in power consumption. In addition, the terminal apparatus 20 reports a measurement report to the small cell base station 10. The small cell base station 10 can select a CC in an off state to be used for transmission of the DRS on the basis of this measurement report.

Here, a CC in the present embodiment is assumed to be a CC in the milli-wave zone, which is a frequency band of 6 GHz or more.

(2) Reporting of Setting Information Regarding DRS
(2.1) First Setting Information The small cell base station 10 (e.g., the reporting unit 153) reports information indicating a CC that can be brought into an on state, to the terminal apparatus 20 that connects to the small cell. Thus, the terminal apparatus 20 can find at least a CC in which the DRS may be transmitted, which makes it possible to avoid measurement in a frequency band with no possibility of transmission of the DRS. Information indicating a CC that can be brought into an on state is also referred to as CC configuration information below.

A CC that can be brought into an on state may be associated with a CC used for transmission of the DRS. For example, this association may be a combination of a CC used for transmission of the DRS and a CC that may be brought into an on state on the basis of a measurement report of the DRS provided in the CC. Moreover, this association may be a bidirectional relationship. For example, in the case where CC configuration information includes information indicating CC1 to CC7 illustrated in FIG. 8, CC2 may be brought into an on state on the basis of a measurement report of CC1, or CC1 may be brought into an on state on the basis of a measurement report of CC2. As a matter of course, at least one of CC2 to CC7 may be brought into an on state on the basis of the measurement report of CC1. As will be described later, the terminal apparatus 20 may request a CC in which provision of the DRS is to be started. In the case where CC configuration information including the above association is reported from the small cell base station 10, the terminal apparatus 20 can request a start of provision of the DRS in a desired CC among CCs that may be brought into an on state depending on the contents of a measurement report.

A CC that can be brought into an on state may include a band different from that of an associated CC used for transmission of the DRS. That is, a CC subjected to measurement does not need to coincide with a CC brought into an on state. For example, in the example illustrated in FIG. 8, CC6 may be brought into an on state on the basis of a measurement result of CC1.

For reporting of CC configuration information, for example, means such as system information (SI), RRC signaling or a physical downlink control channel (PDCCH) may be used. Moreover, reporting of CC configuration information may be performed periodically, or may be performed at any timing (e.g., whenever there is a change). Note that CC configuration information may be static or quasi-static information.

(2.2) Second Setting Information

The small cell base station 10 (e.g., the reporting unit 153) reports information regarding arrangement of the DRS in each CC, to the terminal apparatus 20 that connects to the small cell. Here, arrangement of the DRS refers to a transmission cycle, a frequency in each CC, and the like. Reporting of this information enables the terminal apparatus 20 to perform measurement appropriately. This information is also referred to as DRS arrangement information below.

For reporting of DRS arrangement information, for example, means such as SI, RRC signaling or a PDCCH may be used. Moreover, reporting of DRS arrangement information may be performed periodically, or may be performed at any timing (e.g., whenever there is a change). Note that DRS arrangement information may be static or quasi-static information.

(2.3) Third Setting Information

The small cell base station 10 (e.g., the reporting unit 153) reports information indicating a CC to be used for transmission of the DRS, to the terminal apparatus 20 that connects to the small cell. Reporting of this information enables the terminal apparatus 20 to perform measurement on a CC actually used for transmission of the DRS, among CCs included in the broad frequency band. This information is also referred to as DRS state information below.

Here, FIGS. 9 and 10 illustrate examples of DRS state information. In FIG. 9, a value of a bit position corresponding to each of CC1 to CC7 illustrated in FIG. 8 indicates whether each CC is used for transmission of the DRS. The first bit corresponds to CC1, the second bit corresponds to CC2, the third bit corresponds to CC3, the fourth bit corresponds to CC4, the fifth bit corresponds to CC5, the sixth bit corresponds to CC6, and the seventh bit corresponds to CC7. The bit value 0 indicates that the CC is not used for transmission of the DRS, and the bit value 1 indicates that the CC is used for transmission of the DRS. In FIG. 10, a value of a bit position corresponding to each of CC1 to CC4 illustrated in FIG. 8 indicates whether each CC is used for transmission of the DRS. Information expression in such a form is effective in the case where the DRS is transmitted in a CC with a width of 20 MHz. In this case, four 20-MHz DRSs may be used in a bundle in place of a DRS for 80 MHz.

In addition, the small cell base station 10 may report information indicating a CC of which use in transmission of the DRS is to be started or stopped. That is, in the case where there is a change in a CC to be used for transmission of the DRS, the small cell base station 10 may report information indicating the difference.

Moreover, the small cell base station 10 may report DRS state information in the case where there is a change in a CC to be used for transmission of the DRS. That is, the small cell base station 10 may report DRS state information at timing of a change in a CC to be used for transmission of the DRS. This enables the terminal apparatus 20 to perform measurement on an appropriate CC, even in the case where there is a change in a CC to be used for transmission of the DRS, and enables a reduction in power consumption. As a matter of course, reporting of DRS arrangement information may be performed periodically. The cycle may be approximately 40 ms, for example.

For reporting of DRS state information, for example, means such as SI, RRC signaling or a PDCCH may be used. However, it is desirable to use means capable of instantaneous reporting, such as a PDCCH or SI, for example, for reporting of DRS state information. This enables the terminal apparatus 20 to switch a measurement-target CC instantaneously even under a situation in which a CC in which the DRS is transmitted is switched frequently.

(3) Request for Change of CC to be Used for Transmission of DRS

The terminal apparatus 20 (e.g., the requesting unit 243) may request a change of a CC to be used for transmission of the DRS. For example, the terminal apparatus 20 may report information indicating a CC in an off state to be requested to be used for transmission of the DRS, to the small cell base station 10. That is, the terminal apparatus 20 may request a start of provision of the DRS. Then, the small cell base station 10 (e.g., a DRS transmission processing unit 151) may select a CC to be used for transmission of the DRS on the basis of the request from the terminal apparatus 20 that connects to the small cell. This enables provision of the DRS to be started quickly in a CC in which the terminal apparatus 20 desires to perform measurement. Similarly, the terminal apparatus 20 can also request a stop of provision of the DRS, in which case unnecessary provision of the DRS can be stopped quickly. Such a request is also referred to as a DRS request below.

The terminal apparatus 20 may designate a CC related to a DRS request on the basis of CC configuration information. For example, the terminal apparatus 20 designates a CC in which provision of the DRS is to be requested to be started or stopped, from among a CC in which measurement has been performed and one or more CCs associated in the CC configuration information. For example, in the case where CC configuration information includes information indicating CC1 to CC7 illustrated in FIG. 8, the terminal apparatus 20 may request transmission of the DRS in at least one of CC2 to CC7 in the case where measurement has been performed in CC1.

This DRS request may be reported together with a measurement report, for example. In that case, the small cell base station 10 can select whether or not to start provision of the DRS on the basis of both the measurement report and the DRS request. Note that being reported together may mean concurrent reporting, may mean serial reporting, or may mean being reported included in the same signal or different signals.

(4) On/off of CC

The small cell base station 10 (e.g., the transmission processing unit 151) selects a CC to be brought into an on state or brought into an off state. For example, the small cell base station 10 may make a selection on the basis of a measurement result from the terminal apparatus 20 that connects to the small cell. This makes it possible to appropriately turn on/off a CC in accordance with fluctuation of radio-wave environment, for example.

<3.3. Flow of process>

Figure 11:
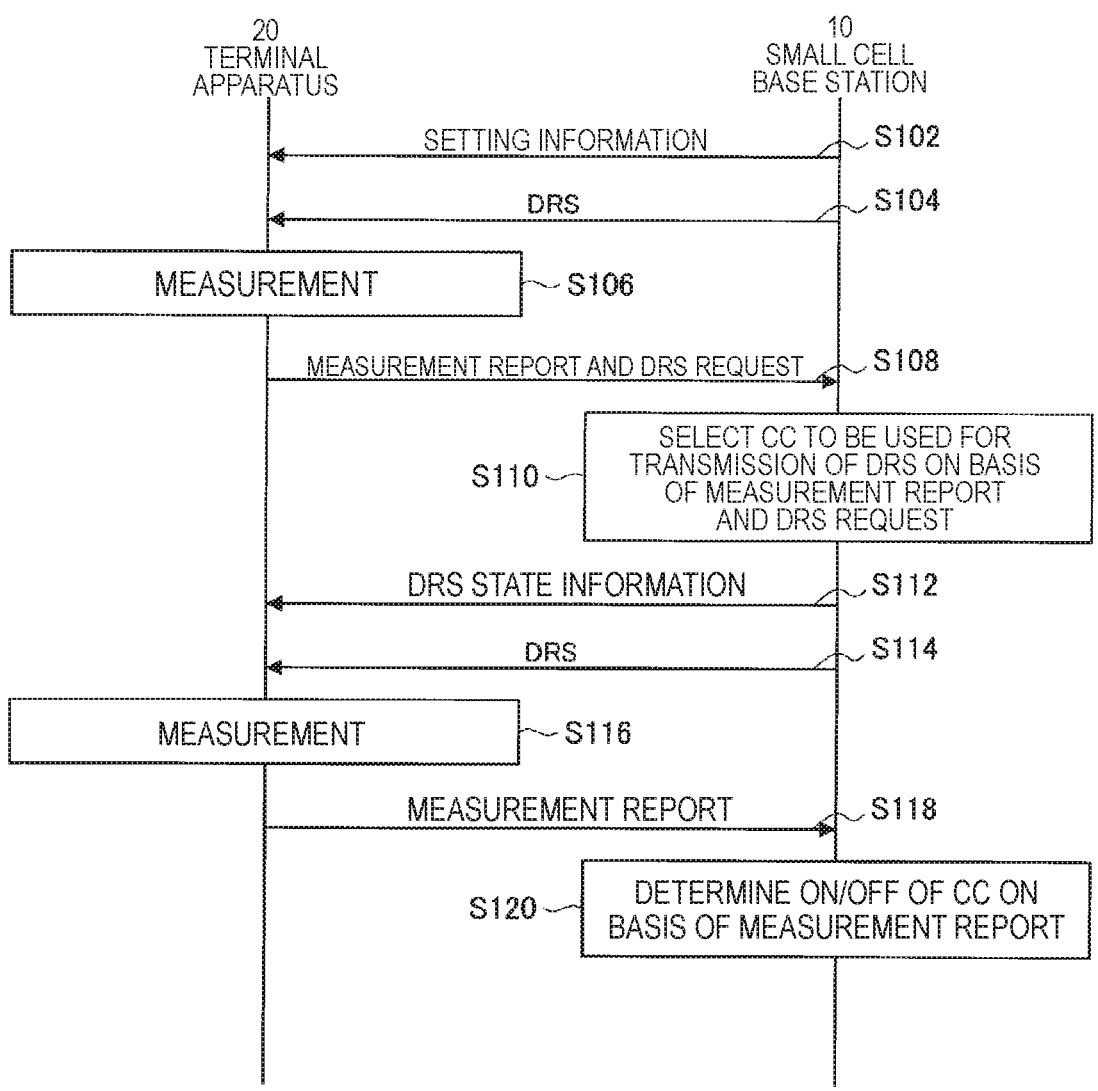
FIG. 11 is a sequence diagram illustrating an example of the flow of a process of a DRS request procedure executed in a system according to the embodiment.

FIG. 11 is a sequence diagram illustrating an example of the flow of a process of a DRS request procedure executed in the system 1 according to the present embodiment. As illustrated in FIG. 11, this sequence involves the small cell base station 10 and the terminal apparatus 20.

First, the small cell base station 10 transmits setting information to the terminal apparatus 20 (step S102). This setting information includes CC configuration information, DRS arrangement information, and DRS state information. CC configuration information includes information indicating a CC used for transmission of the DRS and information being associated with the CC and indicating a CC that can be brought into an on state.

Then, the small cell base station 10 transmits the DRS in accordance with the setting information (step S104). Specifically, the small cell base station 10 transmits the DRS in a CC to be used for transmission of the DRS that is indicated by the DRS state information, among CCs indicated by the CC configuration information, with an arrangement indicated by the DRS arrangement information.

Next, the terminal apparatus 20 performs measurement of the DRS on the basis of the received setting information (step S106), and transmits a DRS request together with a measurement report to the small cell base station 10 (step S108). Note that the measurement report and the DRS request may be transmitted as different messages. Next, the small cell base station 10 selects a CC to be used for transmission of the DRS on the basis of the received measurement report and DRS request (step S110), and transmits DRS state information to the terminal apparatus 20 in accordance with a selection result (step S112). Then, the small cell base station 10 transmits the DRS in a CC of which use has been reported by the DRS state information (i.e., the CC selected in step (S110) (step S114).

Then, the terminal apparatus 20 performs measurement on the basis of the received DRS state information (step S116), and transmits a measurement report to the small cell base station 10 (step S118). Then, the small cell base station 10 determines on/off of a CC on the basis of the measurement report (step S120).

After the above steps, the process ends.

4. Second Embodiment

<4.1. Technical problem>

In the first embodiment, a CC is brought into an on state on the basis of determination on the base station side. Therefore, there is a case where CCs are brought into an on state in a stepwise manner up to a width of 80 MHz; for a terminal apparatus requiring immediate use of a CC with a width of 80 MHz, for example, a long time lag occurs until the requirement is satisfied. Such a time lag may cause a decrease in throughput, or deterioration of Quality of Service (QoS) of a service requiring low delay.

Hence, the present embodiment provides a mechanism in which a terminal apparatus can request a CC to be brought into an on state by a base station.

<4.2. Technical features>

(1) Request for State Change of CC

The terminal apparatus 20 (e.g., the requesting unit 243) may request a state change of a CC. For example, the terminal apparatus 20 may report information indicating a CC to be requested to be brought into an on state to the small cell base station 10. That is, the terminal apparatus 20 may request turning on of a CC. Then, the small cell base station 10 (e.g., the DRS transmission processing unit 151) may select a CC to be brought into an on state on the basis of the request from the terminal apparatus 20 that connects to the small cell. This makes it possible to shorten a time lag until a CC that the terminal apparatus 20 desires to be brought into an on state (typically, a CC desired to be activated after being turned on) is actually brought into an on state. Similarly, the terminal apparatus 20 can also request bringing a CC into an off state, in which case a time lag until a desired CC is actually brought into an off state can be shortened. Such a request is also referred to as a CC state change request below.

The terminal apparatus 20 may designate a CC related to a CC state change request on the basis of CC configuration information. For example, the terminal apparatus 20 designates a CC to be requested to be brought into an on state, from among a CC in which measurement has been performed and one or more CCs associated in the CC configuration information. For example, in the case where CC configuration information includes information indicating CC1 to CC7 illustrated in FIG. 8, the terminal apparatus 20 may request bringing at least one of CC1 to CC7 into an on state in the case where measurement has been performed in CC1.

This CC state change request may be reported together with a measurement report, for example. In that case, the small cell base station 10 can determine on/off of a CC on the basis of both the measurement report and the CC state change request. Note that being reported together may mean concurrent reporting, may mean serial reporting, or may mean being reported included in the same signal or different signals.

(2) Control of Transmission Cycle of DRS

The small cell base station 10 (e.g., the transmission processing unit 151) controls a transmission cycle of the DRS. For example, the small cell base station 10 may make a transmission cycle of the DRS differ for each CC. In regard to a time lag between occurrence of a state change request and satisfaction of the request, in the case where an allowable length of the time lag differs depending on the CC, it is effective to make the transmission cycle differ. In particular, the small cell base station 10 may make a transmission cycle of the DRS shorter for CCs with smaller bandwidths. This can make a time lag shorter for CCs with smaller bandwidths. This is because CCs with smaller bandwidths are required to be used in a higher degree in terms of a reduction in power consumption both in the small cell base station 10 and in the terminal apparatus 20, and are presumed to desire a shorter time lag.

Figure 12:
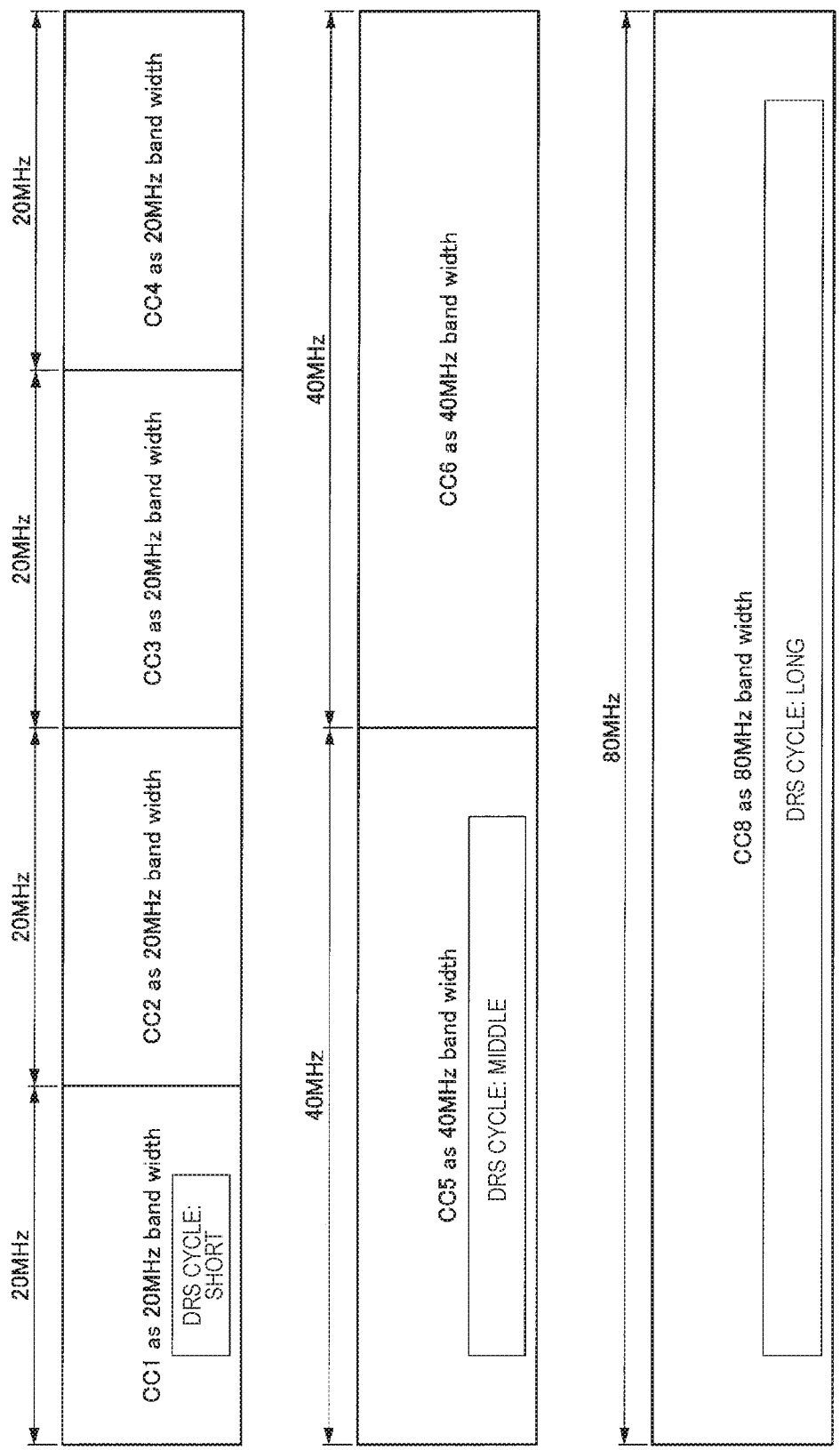
FIG. 12 is an explanatory diagram for describing a technical feature according to a second embodiment.

FIG. 12 illustrates such an example in which a transmission cycle of the DRS is made shorter for CCs with smaller bandwidths. In the example illustrated in FIG. 12, a DRS for a bandwidth of 20 MHz, a DRS for a bandwidth of 40 MHz, and a DRS for a bandwidth of 80 MHz are each transmitted in one CC with the corresponding bandwidth. In addition, the shortest transmission cycle is set in CC1, the longest transmission cycle is set in CC7, and a transmission cycle with a length between those in CC1 and CC7 is set in CC5.

<4.3. Flow of process>

Figure 13:
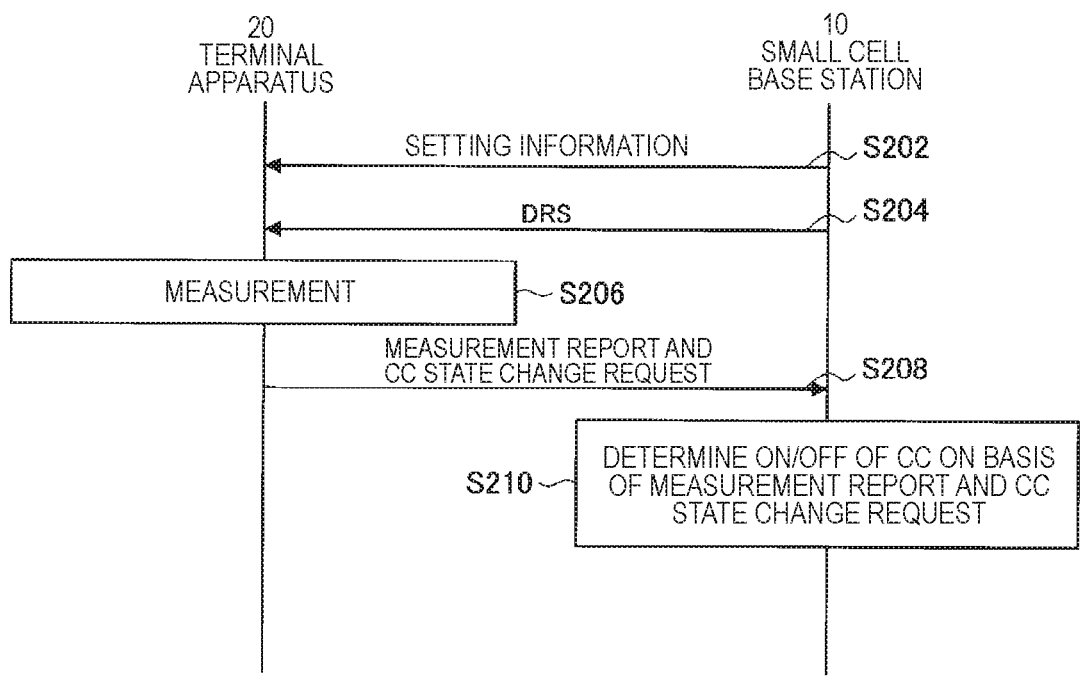
FIG. 13 is a sequence diagram illustrating an example of the flow of a process of a CC state change request procedure executed in a system 1 according to the embodiment.

FIG. 13 is a sequence diagram illustrating an example of the flow of a process of a CC state change request procedure executed in the system 1 according to the present embodiment. As illustrated in FIG. 13, this sequence involves the small cell base station 10 and the terminal apparatus 20.

First, the small cell base station 10 transmits setting information to the terminal apparatus 20 (step S202), and transmits the DRS in accordance with the setting information (step S204).

Then, the terminal apparatus 20 performs measurement of the DRS on the basis of the received setting information (step S206), and transmits a CC state change request together with a measurement report to the small cell base station 10 (step S208). Note that the measurement report and the CC state change request may be transmitted as different messages. Next, the small cell base station 10 determines on/off of a CC on the basis of the received measurement report and CC state change request (step S210).

After the above steps, the process ends.

5. Application Examples

The technology according to the present disclosure is applicable to various products. The small cell base station 10 may also be implemented, for example, as any type of evolved Node B (eNB) such as macro eNBs and small eNBs. Small eNBs may be eNBs that cover smaller cells than the macrocells, such as pico eNBs, micro eNBs, or home (femto) eNBs. Instead, the small cell base station 10 may be implemented as another type of base station such as Nodes B or base transceiver stations (BTSs). The small cell base station 10 may include the main apparatus (which is also referred to as base station apparatus) that controls wireless communication and one or more remote radio heads (RRHs) that are disposed at different locations from that of the main apparatus. Also, various types of terminals described below may function as the small cell base station 10 by temporarily or semi-permanently executing the functionality of the base station. Furthermore, at least some of structural elements of the small cell base station 10 may be realized in a base station apparatus or a module for a base station apparatus.

Further, the terminal apparatus 20 may be implemented, for example, as a mobile terminal such as smartphones, tablet personal computers (PCs), notebook PCs, portable game terminals, portable/dongle mobile routers, and digital cameras, or an in-vehicle terminal such as car navigation apparatuses. Further, the terminal apparatus 20 may be implemented as a machine type communication (MTC) terminal for establishing a machine to machine (M2M) communication. Furthermore, at least some of structural elements of the terminal apparatus 20 may be implemented as a module (e.g., integrated circuit module including a single die) that is mounted on these terminals.

<4.1. Application examples for base station>

First Application Example

Figure 14:
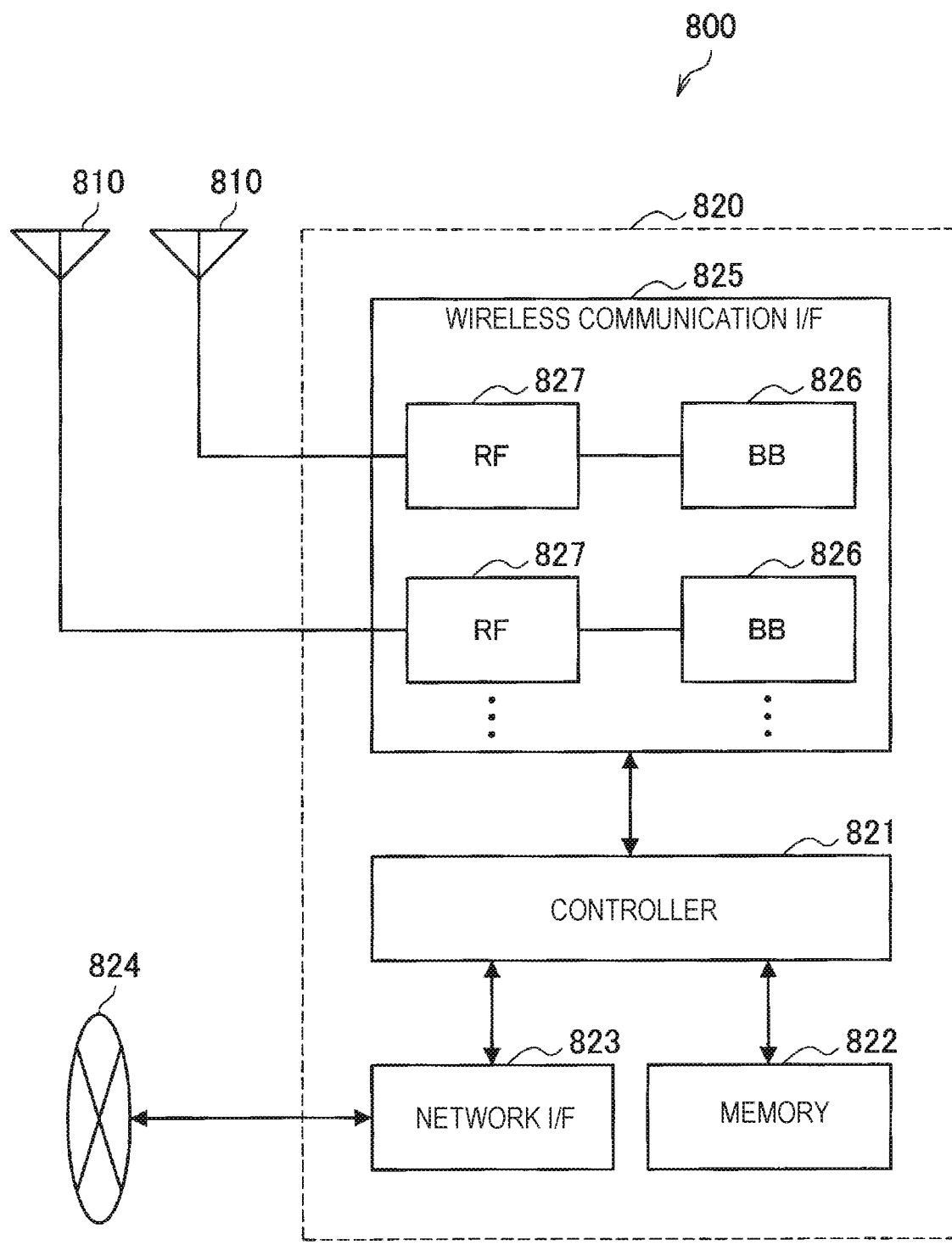
FIG. 14 is a block diagram illustrating a first example of a schematic configuration of an eNB.

FIG. 14 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 14, and the plurality of antennas 810 may, for example, correspond to a plurality of frequency bands used by the eNB 800. It should be noted that while FIG. 14 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 14, and the plurality of BB processors 826 may, for example, correspond to a plurality of frequency bands used by the eNB 800. Further, the wireless communication interface 825 may also include a plurality of the RF circuits 827, as illustrated in FIG. 14, and the plurality of RF circuits 827 may, for example, correspond to a plurality of antenna elements. Note that FIG. 14 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 14, one or more structural elements included in the small cell base station 10 (the transmission processing unit 151 and/or the reporting unit 153) described with reference to FIG. 6 may be implemented by the wireless communication interface 825. Alternatively, at least some of these structural elements may be implemented by the controller 821. As an example, a module which includes a part (for example, the BB processor 826) or all of the wireless communication interface 825 and/or the controller 821 may be mounted in the eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the wireless communication interface 825 (for example, the BB processor 826) and/or the controller 821 may execute the program. As described above, the eNB 800, the base station apparatus 820, or the module may be provided as an apparatus which includes the one or more structural elements, and the program for causing the processor to function as the one or more structural elements may be provided. In addition, a readable recording medium in which the program is recorded may be provided.

In addition, in the eNB 800 illustrated in FIG. 14, the wireless communication unit 120 described with reference to FIG. 6 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823. Further, the storage unit 140 may be implemented by the memory 822.

Second Application Example

Figure 15:
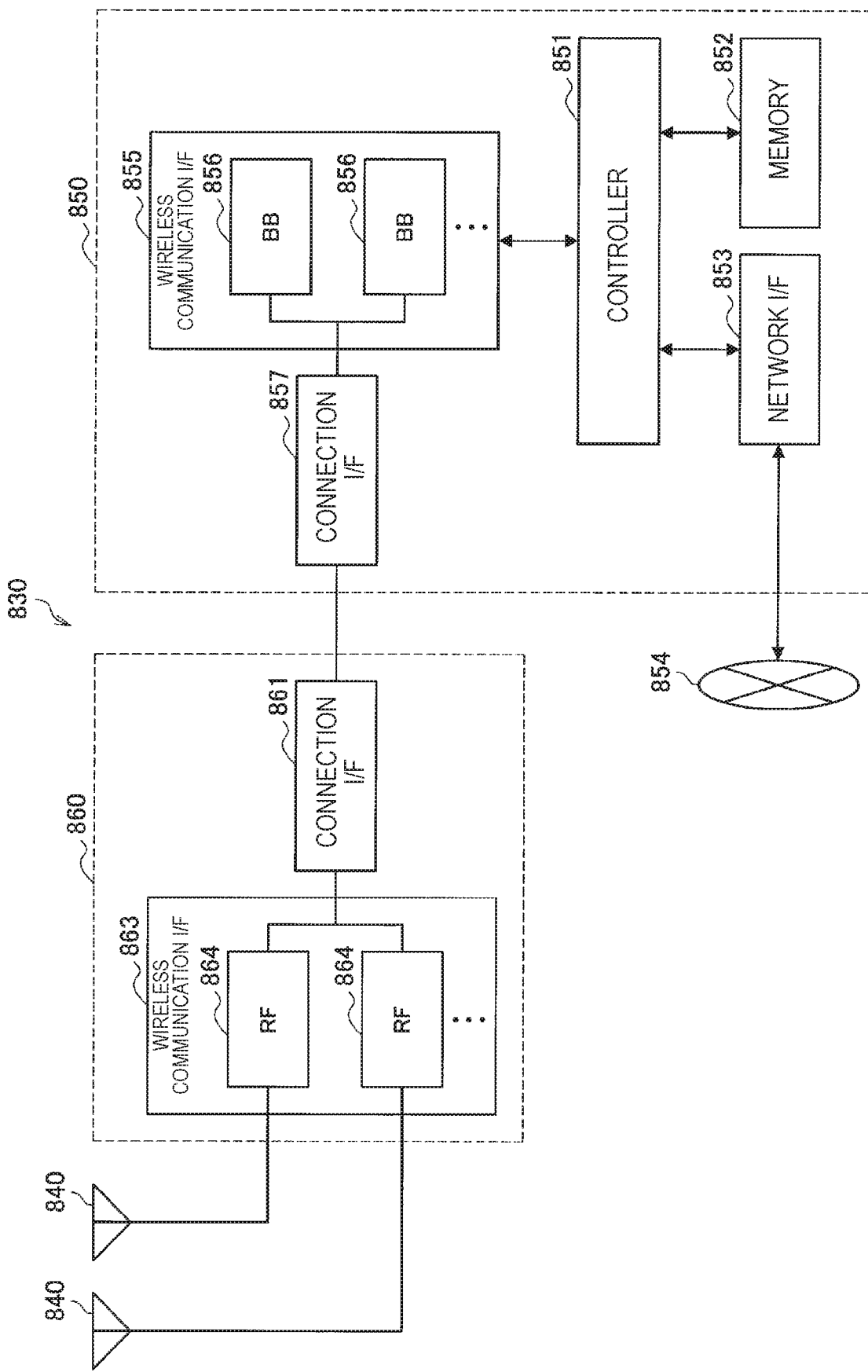
FIG. 15 is a block diagram illustrating a second example of the schematic configuration of the eNB.

FIG. 15 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 15, and the plurality of antennas 840 may, for example, correspond to a plurality of frequency bands used by the eNB 830. Note that FIG. 15 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 14.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 14 except that the BB processor 856 is connected to an RF circuit 864 of the RRH 860 via the connection interface 857. The wireless communication interface 855 may include a plurality of the BB processors 856, as illustrated in FIG. 15, and the plurality of BB processors 856 may, for example, correspond to a plurality of frequency bands used by the eNB 830. Note that FIG. 15 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 15, and the plurality of RF circuits 864 may, for example, correspond to a plurality of antenna elements. Note that FIG. 15 illustrates an example in which the wireless communication interface 863 includes the plurality of RF circuits 864, but the wireless communication interface 863 may include the single RF circuit 864.

In the eNB 830 illustrated in FIG. 15, one or more structural elements included in the small cell base station 10 (the transmission processing unit 151 and/or the reporting unit 153) described with reference to FIG. 6 may be implemented by the wireless communication interface 855 and/or the wireless communication interface 863. Alternatively, at least some of these structural elements may be implemented by the controller 851. As an example, a module which includes a part (for example, the BB processor 856) or all of the wireless communication interface 855 and/or the controller 851 may be mounted in the eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the wireless communication interface 855 (for example, the BB processor 856) and/or the controller 851 may execute the program. As described above, the eNB 830, the base station apparatus 850, or the module may be provided as an apparatus which includes the one or more structural elements, and the program for causing the processor to function as the one or more structural elements may be provided. In addition, a readable recording medium in which the program is recorded may be provided.

In addition, in the eNB 830 illustrated in FIG. 15, for example, the wireless communication unit 120 described with reference to FIG. 6 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

<4.2. Application examples for terminal apparatus>

First Application Example

Figure 16:
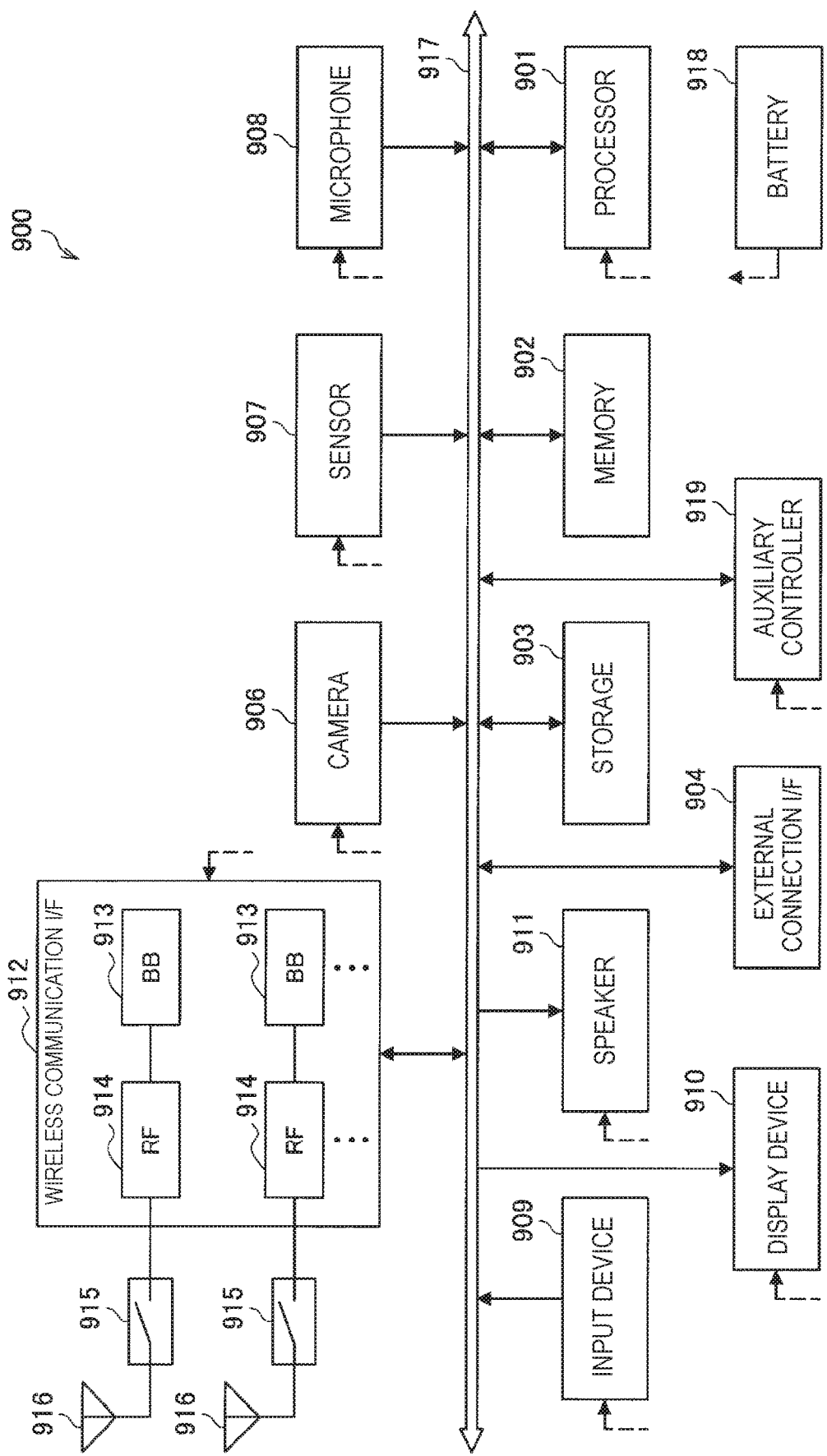
FIG. 16 is a block diagram illustrating an example of a schematic configuration of a smartphone.

FIG. 16 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 16. Note that FIG. 16 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 16. Note that FIG. 16 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 16 via a feeder line that is partially illustrated in the figure as a dashed line. The auxiliary controller 919, for example, operates a minimally necessary function of the smartphone 900 in a sleep mode.

In the smartphone 900 illustrated in FIG. 16, one or more structural elements included in the terminal apparatus 20 (the measurement processing unit 241 and/or the requesting unit 243) described with reference to FIG. 7 may be implemented by the wireless communication interface 912. Alternatively, at least some of these structural elements may be implemented by the processor 901 or the auxiliary controller 919. As an example, a module which includes a part (for example, the BB processor 913) or all of the wireless communication interface 912, the processor 901, and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the wireless communication interface 912 (for example, the BB processor 913), the processor 901, and/or the auxiliary controller 919 may execute the program. As described above, the smartphone 900 or the module may be provided as an apparatus which includes the one or more structural elements, and the program for causing the processor to function as the one or more structural elements may be provided. In addition, a readable recording medium in which the program is recorded may be provided.

In addition, in the smartphone 900 illustrated in FIG. 16, for example, the wireless communication unit 220 described with reference to FIG. 7 may be implemented by the wireless communication interface 912 (for example, the RF circuit 914). Moreover, the antenna unit 210 may be implemented by the antenna 916. Further, the storage unit 230 may be implemented by the memory 902.

Second Application Example

Figure 17:
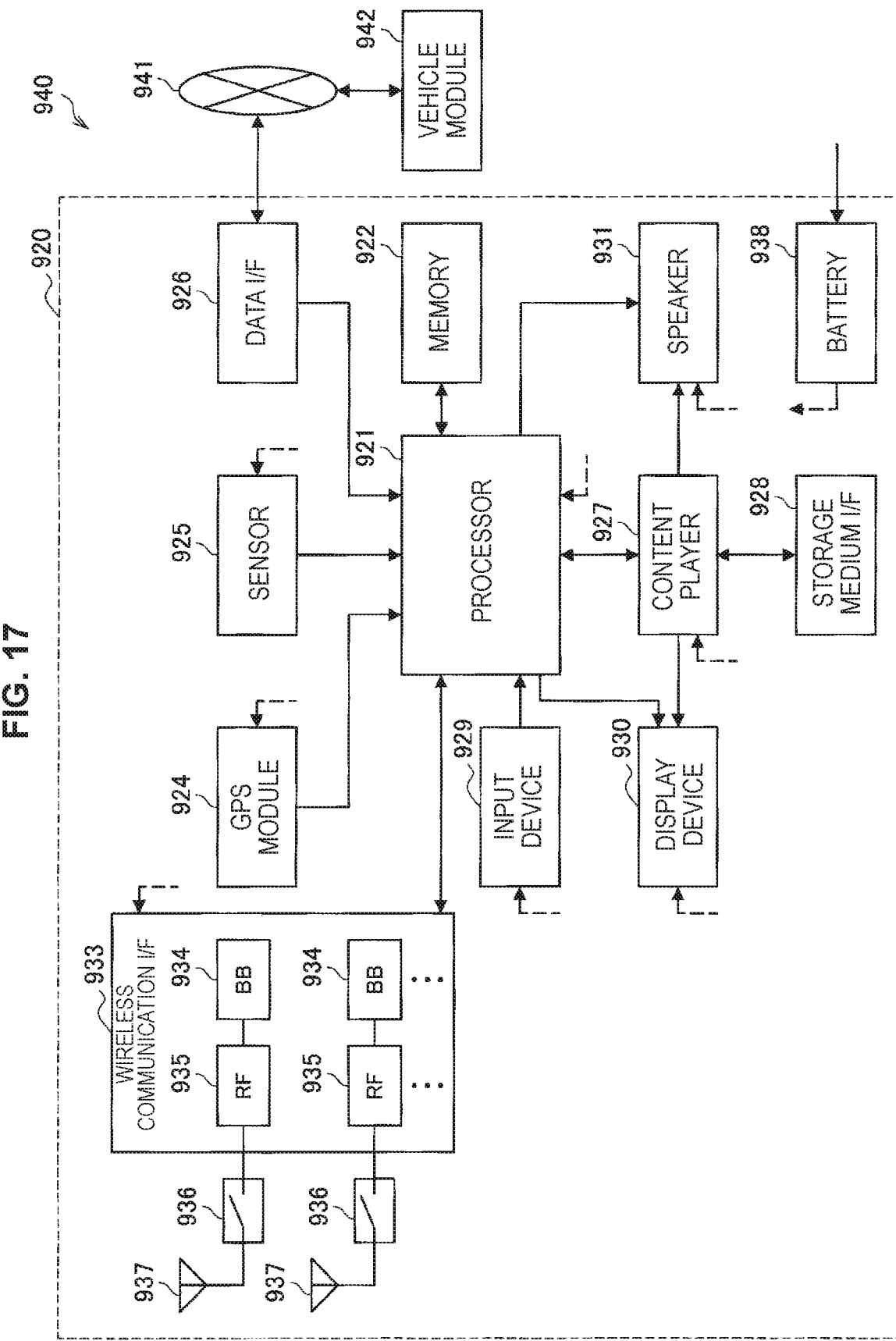
FIG. 17 is a block diagram illustrating an example of a schematic configuration of a car navigation apparatus.

FIG. 17 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 17. Note that FIG. 17 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 17. Note that FIG. 17 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 17 via a feeder line that is partially illustrated in the figure as a dashed line. Further, the battery 938 accumulates the electric power supplied from the vehicle.

In the car navigation apparatus 920 illustrated in FIG. 17, one or more structural elements included in the terminal apparatus 20 (the measurement processing unit 241 and/or the requesting unit 243) described with reference to FIG. 7 may be implemented by the wireless communication interface 933. Alternatively, at least some of these structural elements may be implemented by the processor 921. As an example, a module which includes a part (for example, the BB processor 934) or all of the wireless communication interface 933 and/or the processor 921 may be mounted in the car navigation apparatus 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation apparatus 920, and the wireless communication interface 933 (for example, the BB processor 934) and/or the processor 921 may execute the program. As described above, the car navigation apparatus 920 or the module may be provided as an apparatus which includes the one or more structural elements, and the program for causing the processor to function as the one or more structural elements may be provided. In addition, a readable recording medium in which the program is recorded may be provided.

In addition, in the car navigation apparatus 920 illustrated in FIG. 17, for example, the wireless communication unit 220 described with reference to FIG. 7 may be implemented by the wireless communication interface 933 (for example, the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as an apparatus which includes the measurement processing unit 241 and the requesting unit 243. The vehicle module 942 generates vehicle data such as vehicle speed, engine speed, and trouble information, and outputs the generated data to the in-vehicle network 941.

6. Conclusion

An embodiment of the present disclosure has been described in detail with reference to FIGS. 1 to 17. As described above, the small cell base station 10 according to the present embodiment selects, from among one or more unit frequency bands in an off state in a plurality of unit frequency bands that may be brought into an on state for uplink communication or downlink communication in a small cell, the unit frequency band in an off state to be used for transmission of a discovery signal to enable measurement in the unit frequency band in an off state. Thus, the small cell base station 10 can transmit the discovery signal selectively in a partial band of the broad milli-wave zone, which enables a reduction in power consumption and also a reduction in inter-cell interference. This enables the system 1 to effectively use a unit frequency band using the milli-wave zone, and can improve traffic accommodation efficiency of the terminal apparatus 20 in a cellular network.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that it is not necessary for the processing described in this specification with reference to the flowchart and the sequence diagram to be executed in the order shown in the flowchart and the sequence diagram. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An apparatus that operates a small cell, the apparatus including:

a processing unit configured to select, from among one or more unit frequency bands in an off state in a plurality of unit frequency bands that may be brought into an on state for uplink communication or downlink communication in the small cell, the unit frequency band in an off state to be used for transmission of a discovery signal to enable measurement in the unit frequency band in an off state.

(2)

The apparatus according to (1), in which the processing unit reports information indicating the unit frequency band to be used for transmission of the discovery signal to a terminal that connects to the small cell.

(3)

The apparatus according to (2), in which the processing unit reports the information indicating the unit frequency band to be used for transmission of the discovery signal to the terminal that connects to the small cell, in a case where there is a change in the unit frequency band to be used for transmission of the discovery signal.

(4)

The apparatus according to any one of (1) to (3), in which the processing unit reports information indicating the unit frequency band capable of being brought into an on state to a terminal that connects to the small cell.

(5) The apparatus according to (4), in which the unit frequency band capable of being brought into an on state is associated with the unit frequency band used for transmission of the discovery signal.

(6)

The apparatus according to (5), in which the unit frequency band capable of being brought into an on state includes a band different from the associated unit frequency band used for transmission of the discovery signal.

(7)

The apparatus according to any one of (2) to (6), in which a physical downlink control channel (PDCCH) or system information is used for the reporting.

(8)

The apparatus according to any one of (2) to (7), in which the processing unit performs the reporting periodically.

(9)

The apparatus according to any one of (1) to (8), in which the processing unit increases or reduces the unit frequency band to be used for transmission of the discovery signal in a stepwise manner.

(10)

The apparatus according to any one of (1) to (9), in which the processing unit selects the unit frequency band to be used for transmission of the discovery signal or selects the unit frequency band to be brought into an on state or brought into an off state, on a basis of a measurement result of the discovery signal in a terminal that connects to the small cell.

(11)

The apparatus according to any one of (1) to (10), in which the processing unit selects the unit frequency band to be used for transmission of the discovery signal or selects the unit frequency band to be brought into an on state or brought into an off state, on a basis of a request from a terminal that connects to the small cell.

(12)

The apparatus according to any one of (1) to (11), in which the processing unit makes a transmission cycle of the discovery signal differ for each unit frequency band.

(13)

The apparatus according to (12), in which the processing unit makes the transmission cycle of the discovery signal shorter for the unit frequency band with a smaller bandwidth.

(14)

The apparatus according to any one of (1) to (13), in which the unit frequency band is a component carrier in a frequency band of 6 GHz or more.

(15)

An apparatus that connects to a small cell, the apparatus including:

a processing unit configured to perform measurement regarding a discovery signal that has been transmitted using a unit frequency band selected from one or more unit frequency bands in an off state in a plurality of unit frequency bands that may be brought into an on state for uplink communication or downlink communication in the small cell.

(16)

The apparatus according to (15), in which the processing unit reports information indicating the unit frequency band in an off state to be requested to be used for transmission of the discovery signal, to a base station.

(17) The apparatus according to (15) or (16), in which the processing unit reports information indicating the unit frequency band to be requested to be brought into an on state, to a base station.

(18)

The apparatus according to (16) or (17), in which the processing unit reports information indicating the unit frequency band related to the request, together with a measurement report, to the base station.

(19)
A method including:
selecting, by a processor, from among one or more unit frequency bands in an off state in a plurality of unit frequency bands that may be brought into an on state for uplink communication or downlink communication in a small cell, the unit frequency band in an off state to be used for transmission of a discovery signal to enable measurement in the unit frequency band in an off state.

(20)
A method including:
performing, by a processor, measurement regarding a discovery signal that has been transmitted using a unit frequency band selected from one or more unit frequency bands in an off state in a plurality of unit frequency bands that may be brought into an on state for uplink communication or downlink communication in a small cell.

REFERENCE SIGNS LIST 1 system
10 small cell base station
11 small cell
15 core network
16 packet data network
20 terminal apparatus
30 macro cell base station
31 macro cell
110 antenna unit
120 wireless communication unit
130 network communication unit
140 storage unit
150 processing unit
151 transmission processing unit
153 reporting unit
210 antenna unit
220 wireless communication unit
230 storage unit
240 processing unit
241 measurement processing unit
243 requesting unit

The invention claimed is:

1. An apparatus that operates a small cell, the apparatus comprising:
a processor configured to:
select at least one of a plurality of unit frequency bands that is in the off state to be indicated as being available for measurement, and indicate remaining of the plurality of unit frequency bands that is in the off state as not being available for measurement; and
transmit a measurement signal information report, the report including the indication of which of the plurality of unit frequency bands that is in the off state is indicated as being available for measurement, and
wherein the plurality of unit frequency bands belong to a milli-wave zone.

2. The apparatus according to claim 1, wherein the processor reports information indicating the unit frequency band to be used for transmission of the measurement signal to a terminal that connects to the small cell.

3. The apparatus according to claim 2, wherein the processing circuitry reports the information indicating the unit frequency band to be used for transmission of the discovery measurement signal to the terminal that connects to the small cell, in a case where there is a change in the unit frequency band to be used for transmission of the measurement signal.

4. The apparatus according to claim 1, wherein the processor reports information indicating the unit frequency band capable of being brought into an on state to a terminal that connects to the small cell.

5. The apparatus according to claim 4, wherein the unit frequency band capable of being brought into an on state is associated with the unit frequency band used for transmission of the measurement signal.

6. The apparatus according to claim 5, wherein the unit frequency band capable of being brought into an on state includes a band different from the associated unit frequency band used for transmission of the measurement signal.

7. The apparatus according to claim 2, wherein a physical downlink control channel (PDCCH) or system information is used for the reporting.

8. The apparatus according to claim 2, wherein the processor performs the reporting periodically.

9. The apparatus according to claim 1, wherein the processor increases or reduces the unit frequency band to be used for transmission of the measurement signal in a stepwise manner.

10. The apparatus according to claim 1, wherein the processor selects the unit frequency band to be used for transmission of the measurement signal or selects the unit frequency band to be brought into an on state or brought into an off state, on a basis of a measurement result of the measurement signal in a terminal that connects to the small cell.

11. The apparatus according to claim 1, wherein the processor selects the unit frequency band to be used for transmission of the measurement signal or selects the unit frequency band to be brought into an on state or brought into an off state, on a basis of a request from a terminal that connects to the small cell.

12. The apparatus according to claim 1, wherein the processor makes a transmission cycle of the measurement signal differ for each unit frequency band.

13. The apparatus according to claim 12, wherein the processor makes the transmission cycle of the measurement signal shorter for the unit frequency band with a smaller bandwidth.

14. The apparatus according to claim 1, wherein the unit frequency band is a component carrier in a frequency band of 6 GHz or more.

15. An apparatus that connects to a small cell, the apparatus comprising:
a processor configured to:
receive a measurement signal information report providing information of a plurality of unit frequency bands that are in an off state and may be later brought into an on state for uplink communication or downlink communication in the small cell;
wherein the measurement signal information report indicates at least one of the plurality of unit frequency bands that is in the off state as being available for measurement while in the off state, and remaining of the plurality of unit frequency bands that is in the off state is indicated as not available for measurement while in the off state; and
perform measurement, based upon the received measurement signal information report, of a measurement signal that has been received and that corresponds to the at least one of the plurality of unit frequency bands that is in the off state that was indicated as being available for measurement while in the off state.

16. The apparatus according to claim 15, wherein the processor reports information indicating the unit frequency band to be requested to be used for transmission of the measurement signal, to a base station.

17. The apparatus according to claim 15, wherein the processor reports information indicating the unit frequency band to be requested to be brought into an on state, to a base station.

18. The apparatus according to claim 16, wherein the processor reports information indicating the unit frequency band related to the request, together with a measurement report, to the base station.

19. A method comprising:
   storing measurement signal information for each of a plurality of unit frequency bands that are each in an off state, wherein the off state may be later brought into an on state for uplink communication or downlink communication in the small cell;
   selecting at least one of the plurality of unit frequency bands that is in the off state to be indicated as being available for measurement while in the off state, and indicate remaining of the plurality of unit frequency bands that is in the off state as not being available for measurement while in the off state; and
   transmitting a measurement signal information report, the report including the indication of which of the plurality of unit frequency bands that is in the off state is indicated as being available for measurement while in the off state, and which of the remaining of the plurality of unit frequency bands that is in the off state are not available for measurement while in the off state.

20. A method comprising:
   receiving a measurement signal information report providing information of a plurality of unit frequency bands that are in an off state and may be later brought into an on state for uplink communication or downlink communication in the small cell;
   wherein the measurement signal information report indicates at least one of the plurality of unit frequency bands that is in the off state as being available for measurement while in the off state, and remaining of the plurality of unit frequency bands that is in the off state is indicated as not available for measurement while in the off state; and
   performing measurement, based upon the received measurement signal information report, of a measurement signal that has been received and that corresponds to the at least one of the plurality of unit frequency bands that is in the off state that was indicated as being available for measurement while in the off state.

21. A non-transitory computer readable storage device having computer readable instructions that when executed by processor cause the processor to perform a method comprising:
   storing measurement signal information for each of a plurality of unit frequency bands that are each in an off state, wherein the off state may be later brought into an on state for uplink communication or downlink communication in the small cell;
   selecting at least one of the plurality of unit frequency bands that is in the off state to be indicated as being available for measurement while in the off state, and indicate remaining of the plurality of unit frequency bands that is in the off state as not being available for measurement while in the off state; and
   transmitting a measurement signal information report, the report including the indication of which of the plurality of unit frequency bands that is in the off state is indicated as being available for measurement while in the off state, and which of the remaining of the plurality of unit frequency bands that is in the off state are not available for measurement while in the off state.

22. A non-transitory computer readable storage device having computer readable instructions that when executed by processor cause the processor to perform a method comprising:
   receiving a measurement signal information report providing information of a plurality of unit frequency bands that are in an off state and may be later brought into an on state for uplink communication or downlink communication in the small cell;
   wherein the measurement signal information report indicates at least one of the plurality of unit frequency bands that is in the off state as being available for measurement while in the off state, and remaining of the plurality of unit frequency bands that is in the off state is indicated as not available for measurement while in the off state; and
   performing measurement, based upon the received measurement signal information report, of a measurement signal that has been received and that corresponds to the at least one of the plurality of unit frequency bands that is in the off state that was indicated as being available for measurement while in the off state.

\* \* \* \* \*